US008898308B2

(12) United States Patent
Costenaro et al.

(10) Patent No.: US 8,898,308 B2
(45) Date of Patent: Nov. 25, 2014

(54) METHODS, SYSTEMS, AND COMPUTER-READABLE MEDIUMS FOR CONFIGURING ELECTRONIC MESSAGING APPLICATIONS

(75) Inventors: Daniel P. Costenaro, Bellevue, WA (US); Robert Novitskey, Redmond, WA (US); Erik Ashby, Duvall, WA (US); Bryan Starbuck, Redmond, WA (US); Harvey Rook, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 2523 days.

(21) Appl. No.: 11/073,955

(22) Filed: Mar. 7, 2005

(65) Prior Publication Data
US 2006/0200524 A1 Sep. 7, 2006

(51) Int. Cl.
| G06F 15/16 | (2006.01) |
| G06Q 10/10 | (2012.01) |
| H04L 12/58 | (2006.01) |
| H04L 29/12 | (2006.01) |

(52) U.S. Cl.
CPC .............. *H04L 12/58* (2013.01); *G06Q 10/107* (2013.01); *H04L 51/28* (2013.01); *H04L 61/307* (2013.01)
USPC .......................................... 709/227; 709/206

(58) Field of Classification Search
CPC .............................. H06L 51/28; H06L 61/307
USPC ................................................. 709/227, 206
See application file for complete search history.

(56) References Cited

U.S. PATENT DOCUMENTS

| 6,826,695 | B1 | 11/2004 | House et al. | |
|---|---|---|---|---|
| 6,898,623 | B1 * | 5/2005 | Williams et al. | 709/206 |
| 7,284,045 | B1 * | 10/2007 | Marl et al. | 709/223 |
| 2002/0002581 | A1 * | 1/2002 | Siddiqui | 709/202 |
| 2002/0087670 | A1 | 7/2002 | Epstein et al. | |
| 2003/0023880 | A1 | 1/2003 | Edwards et al. | |
| 2003/0046390 | A1 * | 3/2003 | Ball et al. | 709/224 |

(Continued)

FOREIGN PATENT DOCUMENTS

| GB | 2411253 | 8/2005 |
| WO | 2004/006499 | 1/2004 |

OTHER PUBLICATIONS

Omar Droubit et al.; "Designing a Windows Server 2003 Active Directory," Jun. 27, 2003; 3 pgs.

(Continued)

*Primary Examiner* — Imad Hussain
(74) *Attorney, Agent, or Firm* — Tim Wong; Jim Ross; Micky Minhas

(57) ABSTRACT

Methods, systems, and computer-readable mediums configure electronic messaging applications to communicate with a server storing messages to and/or from an electronic messaging account of a user. A method involves receiving an electronic message address and a password of the user as inputs, deriving server connection settings based on the electronic message address, and applying the server connection settings to the electronic messaging account. Another method involves receiving an electronic message address of the user and discovering the server connection settings for the electronic messaging account on a server having a designated protocol name as a server prefix name to assist in locating the server and having the server connection settings. The method also involves retrieving the server connection settings from a file provided by the server in response to locating the server having the designated name and applying the server connection settings to the electronic messaging account.

20 Claims, 13 Drawing Sheets

(56) References Cited

U.S. PATENT DOCUMENTS

| | | | |
|---|---|---|---|
| 2003/0105824 A1* | 6/2003 | Brechner et al. | 709/206 |
| 2003/0149781 A1 | 8/2003 | Yared et al. | |
| 2003/0233541 A1 | 12/2003 | Fowler et al. | |
| 2004/0044648 A1 | 3/2004 | Anfindsen et al. | |
| 2004/0132429 A1* | 7/2004 | Gill et al. | 455/412.1 |
| 2004/0204949 A1 | 10/2004 | Shaji et al. | |
| 2004/0267890 A1 | 12/2004 | Soulet | |
| 2005/0027851 A1* | 2/2005 | McKeown et al. | 709/224 |
| 2005/0081063 A1 | 4/2005 | Patrick et al. | |
| 2005/0132065 A1* | 6/2005 | Zhou | 709/227 |
| 2005/0198300 A1* | 9/2005 | Gong et al. | 709/227 |
| 2006/0031385 A1* | 2/2006 | Westerdal | 709/217 |
| 2006/0190546 A1* | 8/2006 | Daniell | 709/206 |
| 2011/0271196 A1* | 11/2011 | Rakowski et al. | 715/735 |

OTHER PUBLICATIONS

"Microsoft Windows 'TrustBridge' to Enable Organizations to Share User Identifies Across Business Boundaries," Jun. 6, 2002, 3 pages.

Amir Herzberg, "Access Control Meets Public Key Infrastructure, or: Assigning Roles to Strangers", Dec. 6, 2001, 13 pgs.

U.S. Appl. No. 11/270,955, Notice of Allowance mailed Jul. 1, 2010, 5 pages.

U.S. Appl. No. 11/270,955, Amendment and Response filed Mar. 30, 2010, 9 pages.

U.S. Appl. No. 11/270,955, Non-Final Office Action mailed Dec. 30, 2009, 19 pages.

U.S. Appl. No. 11/270,955, Amendment and Response filed Oct. 21, 2009, 10 pages.

U.S. Appl. No. 11/270,955, Final Rejection mailed Jul. 21, 2009, 17 pages.

U.S. Appl. No. 11/270,955, Amendment and Response filed Mar. 30, 2009, 10 pages.

U.S. Appl. No. 11/270,955, Non-Final Office Action mailed Dec. 23, 2008, 16 pages.

* cited by examiner

METHODS, SYSTEMS, AND COMPUTER-READABLE MEDIUMS FOR CONFIGURING ELECTRONIC MESSAGING APPLICATIONS

COPYRIGHT NOTICE

A portion of the disclosure of this patent document contains material that is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

TECHNICAL FIELD

The present invention generally relates to configuring electronic messaging applications, and more particularly, is related to methods, systems and computer-readable mediums for automatically configuring electronic mail (email) application accounts with server configuration settings necessary to send and receive email.

BACKGROUND

Users of electronic messaging applications, such as email applications, are at one time or another are prompted by a computer to provide communication port and protocol settings with which the users are not familiar. The typical email user only remembers his or her e-mail address and often believes that entering an e-mail address in the computer should be sufficient for the entire configuration to take place. Further, one of the top customer support costs for some email software manufacturers is configuring email applications to connect to a server, with which the user has an account, and download e-mails. People generally do not understand how to find configuration settings for their server. Nor do people understand how to tell email applications, such as OUTLOOK from MICROSOFT CORPORATION of Redmond, Wash., their server settings.

Previous systems have attempted to address the industry need by shipping a small database of, for example, the top 10 ISPs server connection settings. However, these previous approaches are lacking in that they provide static data without a mechanism to dynamically update the server configuration settings. Thus, if a user has an old version of the product and the ISP has changed their server connection settings, the database will provide the wrong settings.

Accordingly there is an unaddressed need in the industry to address the aforementioned deficiencies and inadequacies.

SUMMARY

Embodiments of the present invention provide methods, systems, and computer-readable mediums for configuring electronic messaging application accounts with server configuration or connection settings necessary to send and receive electronic messages. Some embodiments determine server names and configuration settings necessary to send and receive e-mail by deriving the server connection settings based on an e-mail address provided by a user. Other embodiments retrieve the server connection settings from a markup language file provided by an ISP or built by a custom mail server. Algorithms and associated technology that intelligently derive or guess the server connection settings are referred to herein as Guessmart elements and algorithms and associated technology that retrieve the server connection settings are referred to herein as AutoDiscovery (AD) elements. An aspect of the invention relates to the user experience of typing in an e-mail address and having the email application automatically configure server connection settings based on the email address.

One embodiment is a method for configuring an electronic message application to communicate with a server storing messages at least one of to and from an electronic message account of a user. The method involves receiving an electronic message address and a password of the user as inputs, deriving server connection settings based on the electronic message address, and applying the server connection settings to the electronic message account.

Another embodiment is a computer program product including a computer-readable medium having control logic stored therein for causing a computer to configure an electronic message application to send and receive electronic messages for an electronic message account. The control logic includes computer-readable program code for causing the computer to receive an electronic message address and a password of a user, derive server connection settings based on a domain name of the electronic message address, and apply the server connection settings to the electronic message account.

Still another embodiment is a computer-implemented system for configuring an email application to send and receive emails utilizing server connection settings for an email account of a user. The system includes a client computer operative to receive an electronic message address and a password of the user, derive the server connection settings from the email address received, and apply the server connection settings to the email account.

Another embodiment is a method for configuring an electronic message application to communicate with a server storing messages to and/or from an electronic message account of a user. The method involves receiving an electronic message address of the user and discovering actual server connection settings for the electronic message account on a server having a designated protocol name as a server prefix name to assist in locating the server and having the server connection settings. The method also involves retrieving the server connection settings from a file provided by the server in response to locating the server having the designated name and applying the server connection settings to the electronic message account.

Still another embodiment is a computer-readable medium having computer executable components. The computer executable components include a first component that is arranged to indicate that a retrieved XML payload comprises a response to a request for server connection settings that support an account associated with an application program, the request being initiated from the application program executing on a client computer to a server having a designated service to provide an XML payload to assist the client computer in locating the server. The computer executable components also include a second component arranged to specify a type of the account, a third component arranged to indicate whether the retrieved XML payload contains the server connection settings, whether the request will be redirected to another server for the server connection settings, or whether an email address used by the application program to request the server connection settings should be changed.

Still further, the computer executable components include a fourth component arranged to enclose specifications for the server connection settings when the third component is arranged to indicate that the retrieved XML payload contains the server connection settings, a fifth component arranged to specify a kind of mail account being configured for the type of the account, and a sixth component arranged to specify a name of a mail server corresponding to the kind of mail account being configured.

The invention may be implemented utilizing a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION

Figure 1:
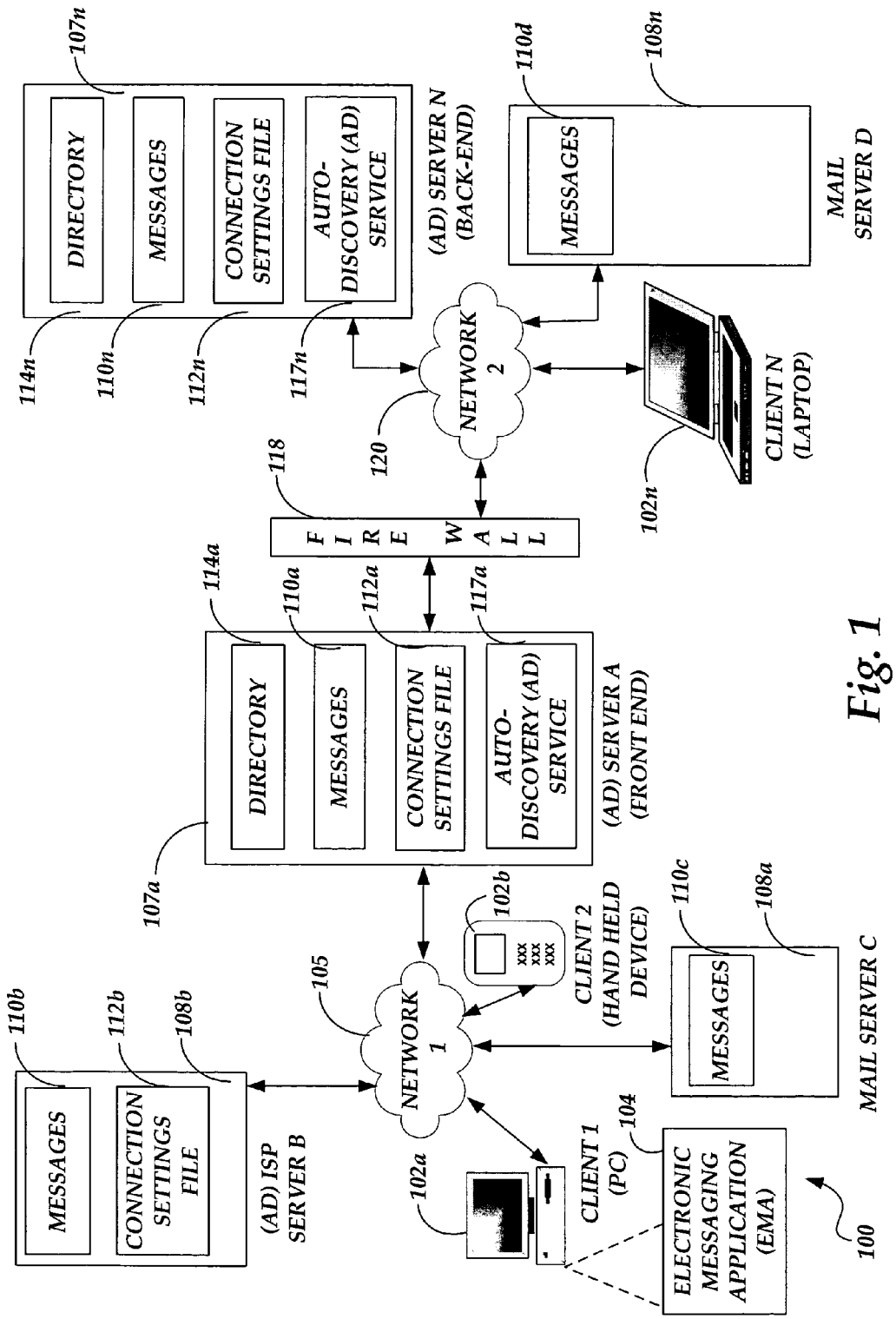
FIG. 1 is a block diagram illustrating client computing apparatuses, servers, and a network architecture that provide an illustrative operating environment for illustrative embodiments of the present invention.

Referring now to the drawings, in which like numerals represent like elements, various aspects of the present invention will be described. In particular, FIGS. 1-2 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, operations, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a block diagram showing client computing apparatuses, servers, and a network architecture that provide an illustrative operating environment 100 for illustrative embodiments of the present invention will be described. The operating environment 100 includes computing apparatuses 102a-102n, where each computing apparatus executes a client electronic messaging application (EMA) 104, such as OUTLOOK from MICROSOFT CORPORATION. The operating environment 100 also includes mail servers 108a-108n that adhere to a number of Internet protocol standards and customized mail servers 107a-107n, such as a MICROSOFT EXCHANGE Server from MICROSOFT CORPORATION. Server 107a is a front-end server outside of a firewall 118 that interfaces with a network 105, such as the Internet and the server 107n is a back-end server that interfaces with a network 120, such as an intranet network.

Each server 107 and 108 may respectively store messages, such as messages 110a-110n that are sent to or received from the client computing apparatuses 102a-102n. The servers 107a-107n may be AutoDiscovery elements each having an AutoDiscovery service 117a and 117n respectively. The AutoDiscovery services 117a-117n, for example in response to receiving a request from the EMA 104, are enabled to respectively build connection settings files 112a and 112n from data retrieved from directories 114a-114n. The directories 114a-114n contain the location of messages for each user/account holder with an email address. Thus, the connection settings files 112a-112n provide the settings necessary for the EMAs 104 to send and receive messages both inside and outside of the firewall 118. The connection settings files 112a-112n may be XML files.

An Internet Service Provider (ISP) server, for example the server 108b, participating in AutoDiscovery may also provide a connection settings file 112b for the EMA to retrieve up to date connection settings from upon request. Additional details regarding deriving and retrieving server connection settings will be described below with respect to FIGS. 2-13.

Figure 2:
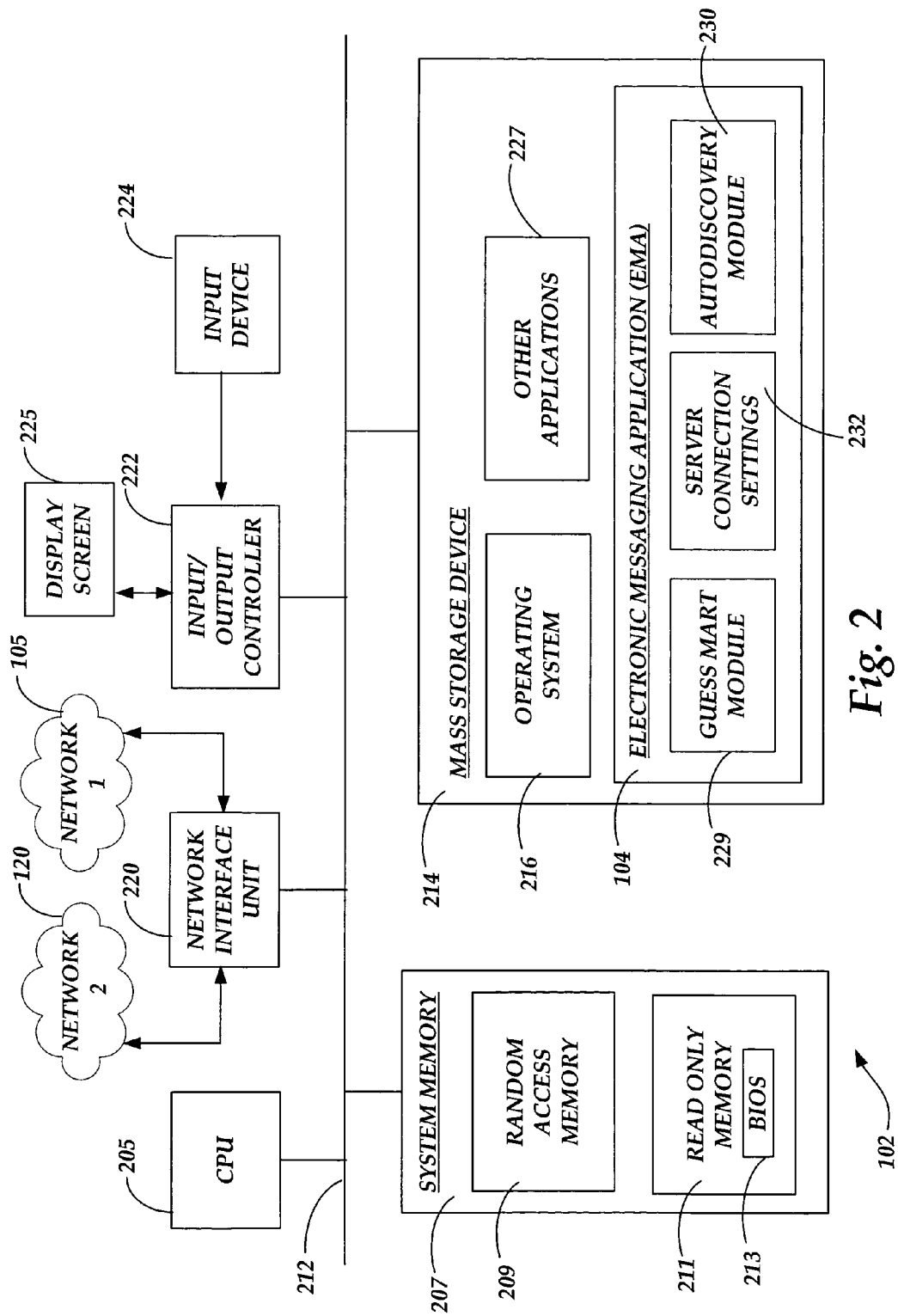
FIG. 2 is a computing system architecture illustrating a client computing apparatus utilized in and provided by various illustrative embodiments of the invention.

Referring now to FIG. 2, a computing system architecture illustrating a client computing apparatus 102 utilized in various illustrative embodiments of the invention will be described. The computer architecture shown in FIG. 2 illustrates a computing apparatus 102, such as a desktop, laptop, or handheld computing apparatus, including a central processing unit 205 ("CPU"), a system memory 207, including a random access memory 209 ("RAM") and a read-only memory ("ROM") 211, and a system bus 212 that couples the memory to the CPU 205. A basic input/output system 213 (BIOS) containing the basic routines that help to transfer information between elements within the computer, such as during startup, is stored in the ROM 211. The computing apparatus 102 further includes a mass storage device 214 for storing an operating system 216, application programs, and other program modules, which will be described in greater detail below.

The mass storage device 214 is connected to the CPU 205 through a mass storage controller (not shown) connected to the bus 212. The mass storage device 214 and its associated computer-readable media provide non-volatile storage for the computing apparatus 102. Although the description of computer-readable media contained herein refers to a mass storage device, such as a hard disk or CD-ROM drive, it should be appreciated by those skilled in the art that computer-readable media can be any available media that can be accessed by the computing apparatus 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVDs"), or other optical storage, magnetic cassettes, magnetic tape, magnetic disk storage or other magnetic storage devices, or any other medium which can be used to store the desired information and which can be accessed by the computing apparatus 102.

According to various embodiments of the invention, the computing apparatus 102 may operate in a networked environment using logical connections to remote computers through networks 120 and 105, such as the Internet or intranet. The computing apparatus 102 may connect to the networks 120 and 105 through a network interface unit 220 connected to the bus 212. It should be appreciated that the network interface unit 220 may also be utilized to connect to other types of networks and remote computer systems. The computing apparatus 102 may also include an input/output controller 222 for receiving and processing input from a number of other devices, including a keyboard, mouse, or electronic stylus (shown as input device 224 in FIG. 2). Similarly, an input/output controller 222 may provide output to a display screen 225, a printer, or other type of output device.

As mentioned briefly above, a number of program modules and data files may be stored in the mass storage device 214 and RAM 209 of the computing apparatus 102, including an operating system 216 suitable for controlling the operation of a networked personal computer, such as the WINDOWS XP operating system from MICROSOFT CORPORATION of Redmond, Wash. The mass storage device 214 and RAM 209 may also store one or more program modules. In particular, the mass storage device 214 and the RAM 209 may store the EMA 104. The EMA 104 is operative to provide functionality for the creation and configuration of electronic messaging accounts utilizing server connection settings 232. The EMA 104 also includes a Guessmart code module 229 for deriving or guessing server connection settings and/or an AutoDiscovery code module 230 for discovering or retrieving the server connection settings from an AutoDiscovery protocol connection settings file provided on an ISP or customized mail server. According to one embodiment of the invention, the EMA 104 and other application programs 227 comprise the OFFICE suite of application programs from MICROSOFT CORPORATION including the WORD, EXCEL, and POWERPOINT application programs. The other application programs 227 may also include a web browser application, such as INTERNET EXPLORER from MICROSOFT CORPORATION.

Specifically the Guessmart module 229 is operative to derive server connection settings by using an email address and password received by the EMA 104. The Guessmart module 229 will take the domain portion of the e-mail address which is the portion after the @ sign and apply known server prefix names to the domain portion (DNS) of the email address. The Guessmart module 229 then attempts to connect to a server and login with the password. For example, an email address, such as friendlyjon@bar.com, provides notice that a server supporting this email account is in the bar.com domain. However, the Guessmart module 229 will derive or guess the prefix name of the server by trying a variety of known prefix names, such as "mail" or "pop", and attempting to connect and login to a server.

Thus, the Guessmart module 229 will apply a common set of prefixes in front of email address DNS names and attempt to connect and login to a server. This process attempts a variety of server name combinations, port combinations, and authentication combinations. Different permutations of the domain are used to attempt connections. All permutations calculated for server names are attempted for each trimmed level of the domain name (e.g. users.mail.bar.com, then mail.bar.com, then finally bar.com).

The Guessmart module 229 examines the combinations that succeed at login and place them in a priority order. For example, the Guessmart module 229 may give preference to the most secure settings. Thus, if a secure way to log in on a secure port is detected, the Guessmart module 229 will store these secure settings as the server connection settings to be used for the account. Attempts to connect and login are made using post office protocol (POP), Internet message access protocol (IMAP), and simple mail transfer protocol (SMTP). SMTP is a send only protocol. IMAP and POP are receive only protocols. Thus, the Guessmart module 229 may derive one receive protocol and one send protocol which become the settings that are used for the email account. According to an illustrative embodiment of the present invention, prefixes utilized to derive server connection settings are identified below in Table 1, in order of attempt.

TABLE 1

Prefixes to Guess with (In Attempt Order)

Incoming POP Prefixes
pop
mail
sslmail
pop3
securepop
<blank> (No prefix)
Incoming IMAP Prefixes
mail
imap
<blank> (No prefix)
Outgoing Prefixes
smtp
smtpauth
mail
mailhost
securesmtp
<blank> (No prefix)

Another embodiment of the present invention is a technology that very specifically defines exactly what the server connection settings are that are necessary to connect to a server. The AutoDiscovery module 230 enables the EMA 104 to automatically configure and connect to custom and ISP servers. The AutoDiscovery module 230 searches for and finds an AutoDiscovery Service 117a or 117b on a front-end (FE) or back-end (BE) server.

The AutoDiscovery module 230 will use an email address to look up information needed to configure EMA 104. For example, given an email name (like UserName@project.dept.div.company.tld), The AutoDiscovery module 230 generates a list of possible AutoDiscovery servers. The AutoDiscovery module 230 then contacts the name autodiscover.<domainname> request the information, for example the connection settings. If that information is not found, the level of domains is reduced until one is found or the second level domain is tried. If the information still isn't retrieved, then a public service is tried. For this example these servers are tried:
1. autodiscover.project.dept.div.company.tld
2. autodiscover.dept.div.company.tld
3. autodiscover.div.company.tld
4. autodiscover.company.tld
5. a public service that provides XML payload for configuration purposes When the AutoDisovery Service 117 is found, the service 117 dynamically builds a configuration template or file 112a or 112b in XML using configuration data from the AD directory 114a or 114b. The AutoDiscovery module 230 then downloads the configuration information from the AutoDiscovery Service 117. Then the EMA 104 connects to a mail server using the appropriate configuration settings.

Similarly, an ISP may implement AutoDiscovery. The XML connection settings in this embodiment will likely be statically stored on an ISP server rather than dynamically built by a service thus, providing scalability, and easier implementation for an ISP. For example, a static XML file having all the information needed to connect to a mail server and in fact also provides information about a non-standard port needed to connect to an SMTP server provides exact settings that are not likely to be guessed. The EMA 104 can then find and retrieve the server connection settings from a markup language file, for instance the static XML file, and configure to connect to a server.

In various embodiments of the invention, the connection settings files 112a-112n may be formatted according to extensible markup language ("XML"). As is understood by those skilled in the art, XML is a standard format for communicating data. In the XML data format, a schema is used to provide XML data with a set of grammatical and data type rules governing the types and structure of data that may be communicated. Additional details regarding discovering server connection settings will be described below with respect to FIGS. 3-13.

Figure 3:
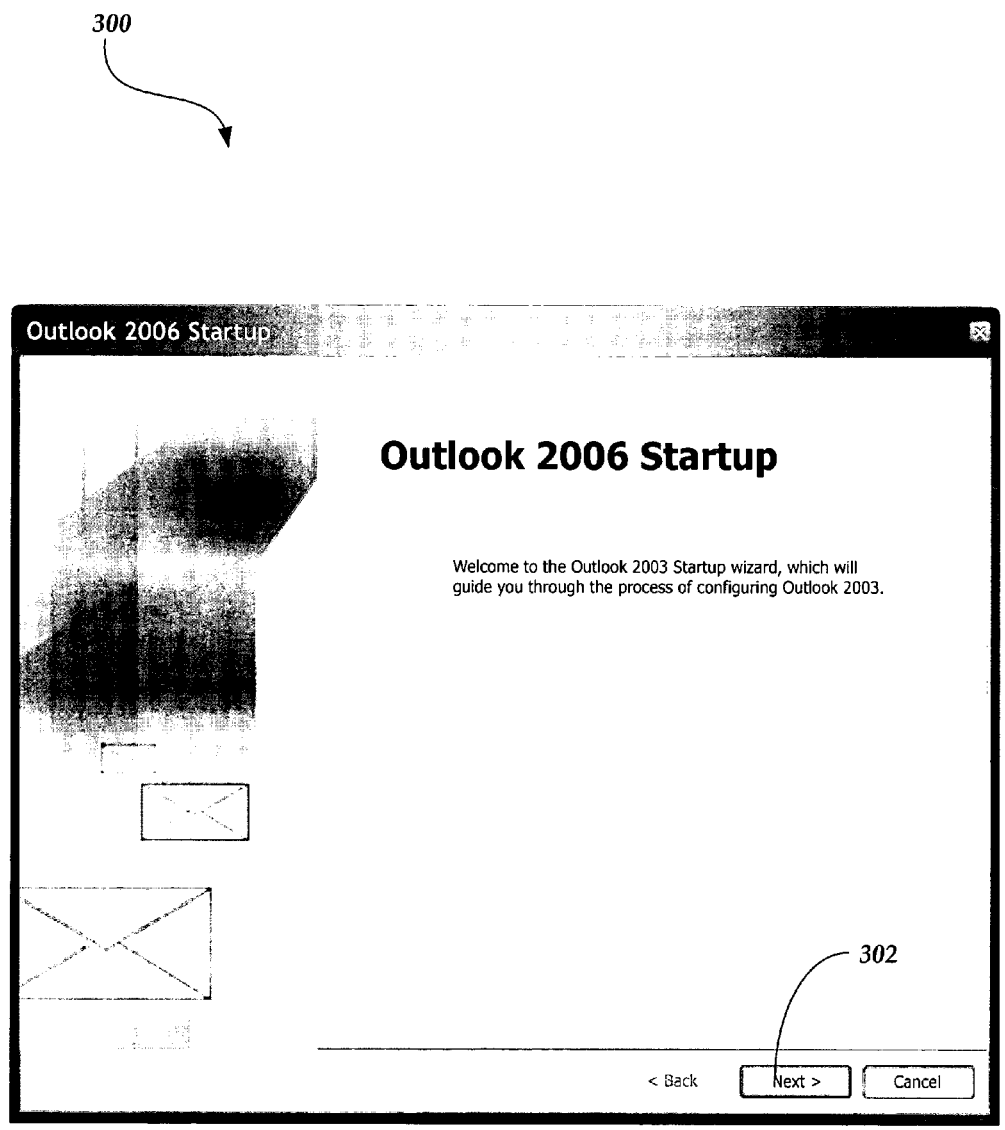
FIG. 3 is a computer screen display illustrating a user interface displaying a welcome screen for an electronic messaging application startup wizard for guiding a user through a configuration process according to an illustrative embodiment of the present invention.

FIG. 3 is a computer screen display illustrating a user interface 300 displaying a welcome screen for an electronic messaging application startup wizard for guiding a user through a configuration process according to an illustrative embodiment of the present invention. The user interface 300 prompts the user to select a next button 302 to continue with the startup wizard guide.

Figure 4:
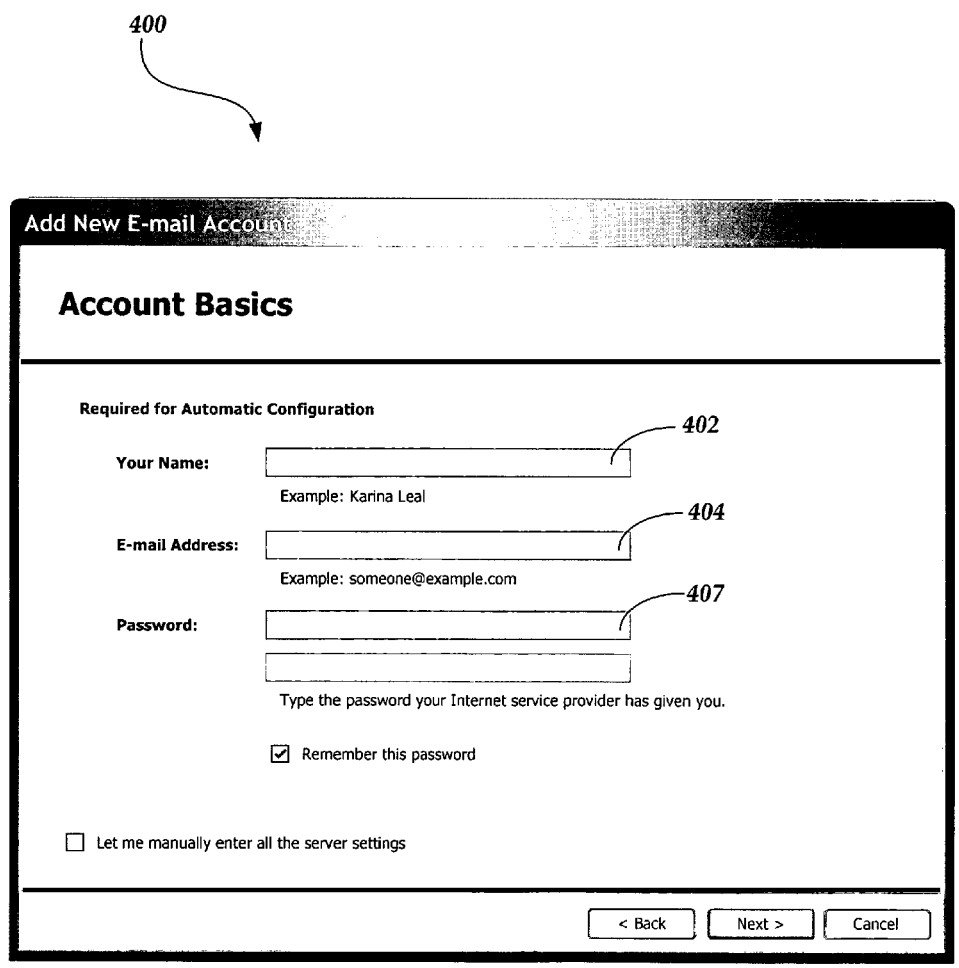
FIG. 4 is a computer screen display illustrating a user interface displaying a data entry screen for adding a new email account to an electronic messaging application according to an illustrative embodiment of the present invention.

FIG. 4 is a computer screen display illustrating a user interface 400 displaying a data entry screen for adding a new email account to the electronic messaging application according to an illustrative embodiment of the present invention. The user interface 400 prompts the user to enter a name in a name entry window 402, an email address in an email address entry window 404, and a password in a password entry window 407.

Figure 5:
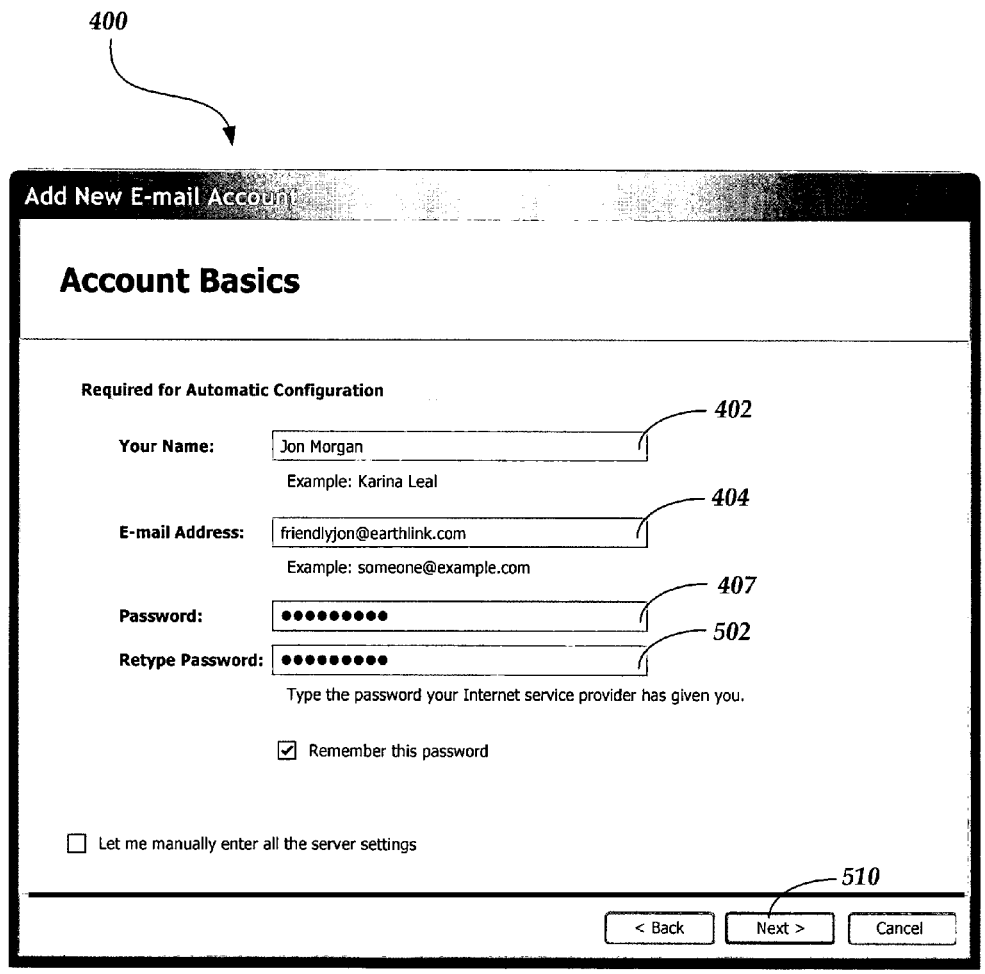
FIG. 5 is a computer screen display illustrating a user interface displaying the data entry screen of FIG. 4 after receiving the data according to an illustrative embodiment of the present invention.

FIG. 5 is a computer screen display illustrating the user interface 400 displaying the data entry screen of FIG. 4 after receiving the data according to an illustrative embodiment of the present invention. The user interface 400 prompts the user to retype the password in a password retype window 502. The user interface 400 also prompts the user to submit the data by selecting a next button 510.

Figure 6:
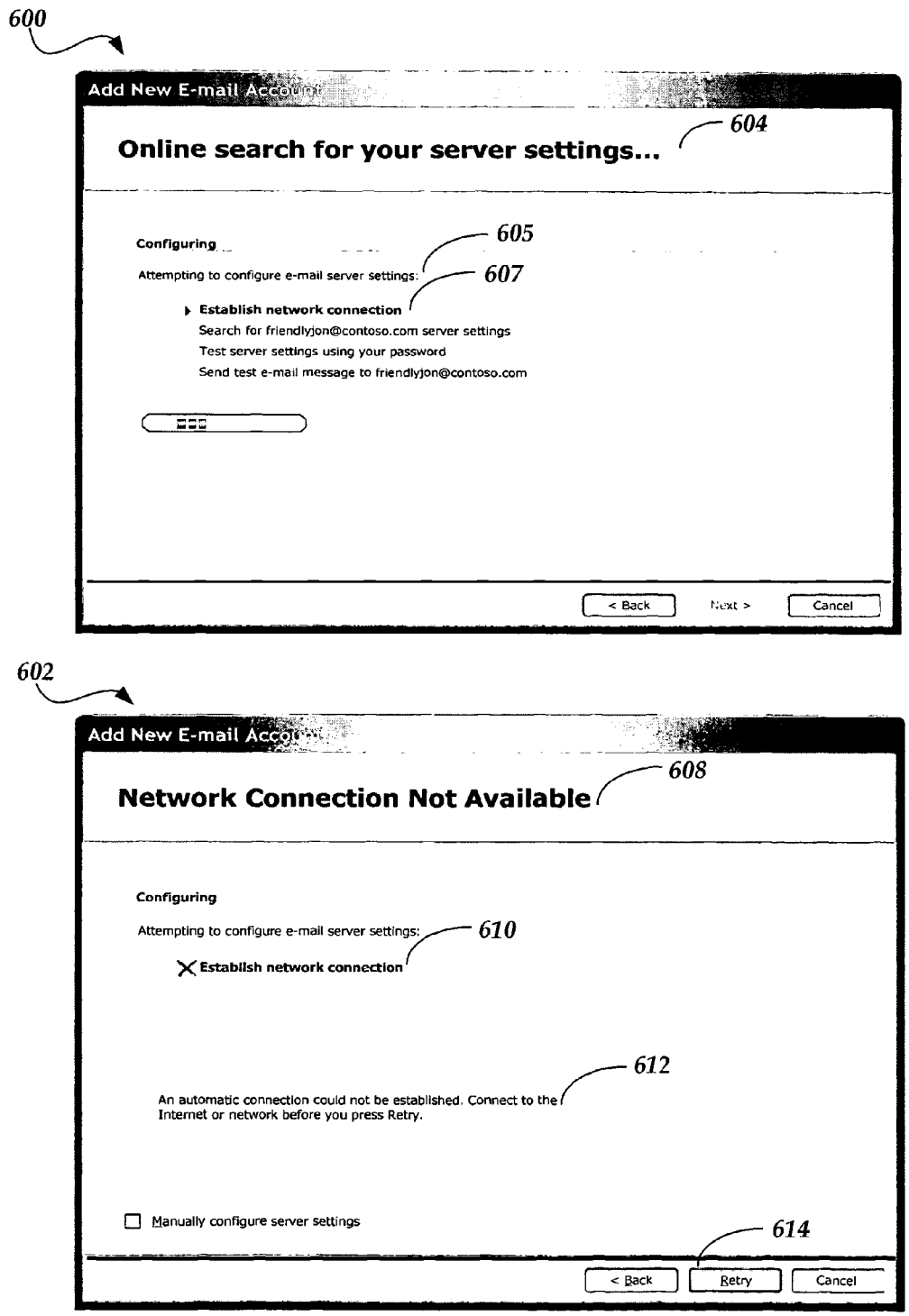
FIG. 6 shows computer screen displays illustrating user interfaces displaying the progress of the configuration process during an online search for server connection settings and a corresponding error screen display when a network connection is unavailable according to an illustrative embodiment of the present invention.

FIG. 6 shows computer screen displays illustrating user interfaces 600 and 602 respectively displaying the progress of the configuration process during an online search for server connection settings and a corresponding error screen display when a network connection is unavailable according to an illustrative embodiment of the present invention. The user interface 600 identifies the current status of the configuration process by displaying task indicator text 604, 605, and 607. The indicator text 607 is in bold print with an arrow indicating that the task is currently in progress.

The user interface 602 displays an error screen with status indicator text 608 and 610 indicating that a network connection is unavailable. The status indicator text 610 is in bold print with an 'X' indicating that the task was unsuccessful. An instruction text 612 is also provided by the user interface 602. The user interface 602 also prompts the user to continue by selecting the retry button 614.

Figure 7:
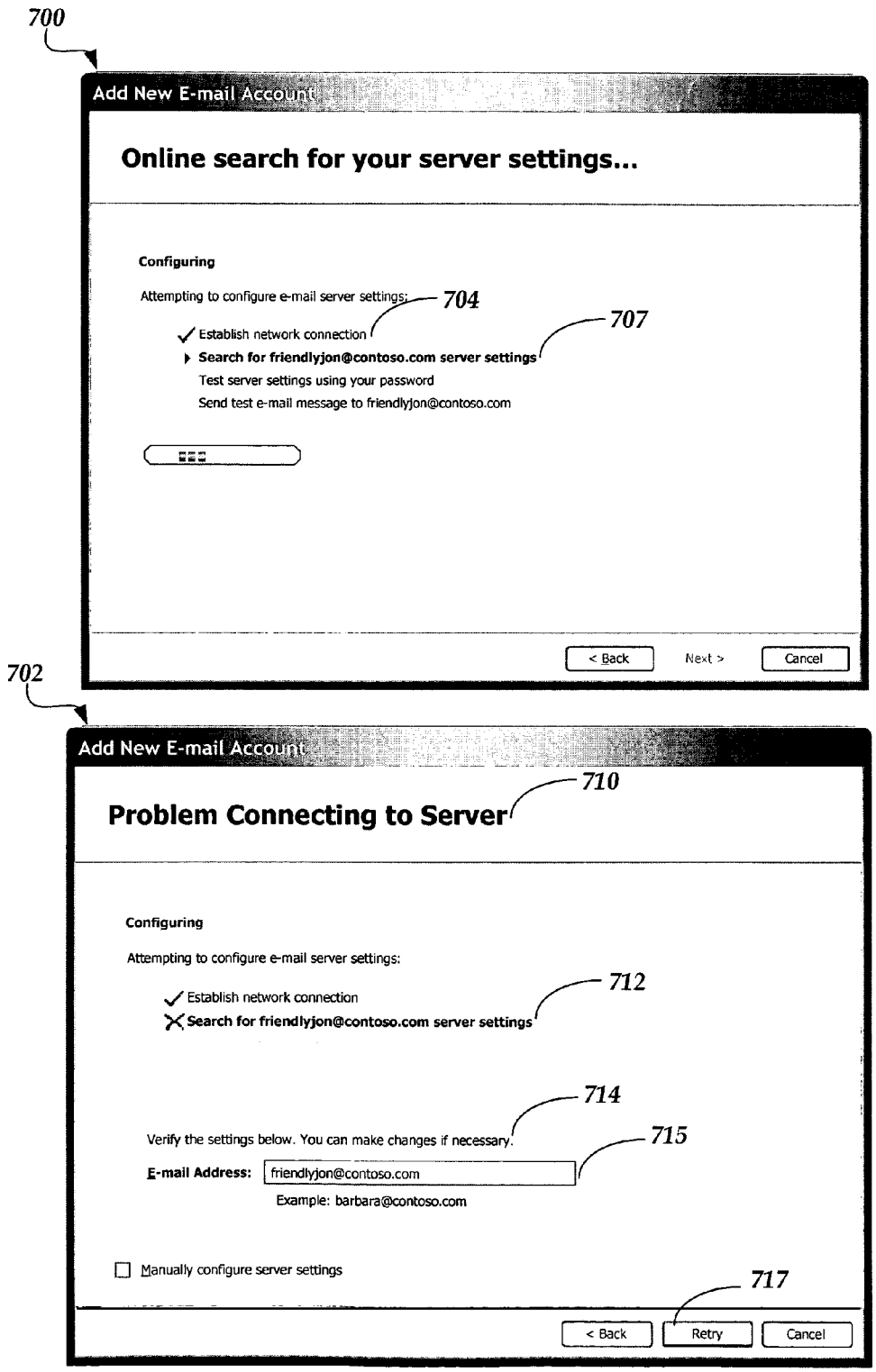
FIG. 7 shows computer screen displays illustrating user interfaces displaying the progress of the configuration process during the online search for server connection settings and a corresponding error screen display when there is a problem connecting to a server according to an illustrative embodiment of the present invention.

FIG. 7 shows computer screen displays illustrating user interfaces 700 and 702 respectively displaying the progress of the configuration process during the online search for server connection settings and a corresponding error screen display when there is a problem connecting to a server according to an illustrative embodiment of the present invention. The user interface 700 displays a checkmark 704 indicating successful completion of a task and task indicator text 707 to show present progress of the configuration process.

The user interface 702 displays an error screen with status indicator text 710 and 712 indicating a problem connecting to a server. The status indicator text 712 is in bold print with an 'X' indicating that the task was unsuccessful. An instruction text 714 is also provided by the user interface 702 with a data change prompt for an email address window 715. The user interface 702 also prompts the user to continue by selecting the retry button 717.

Figure 8:
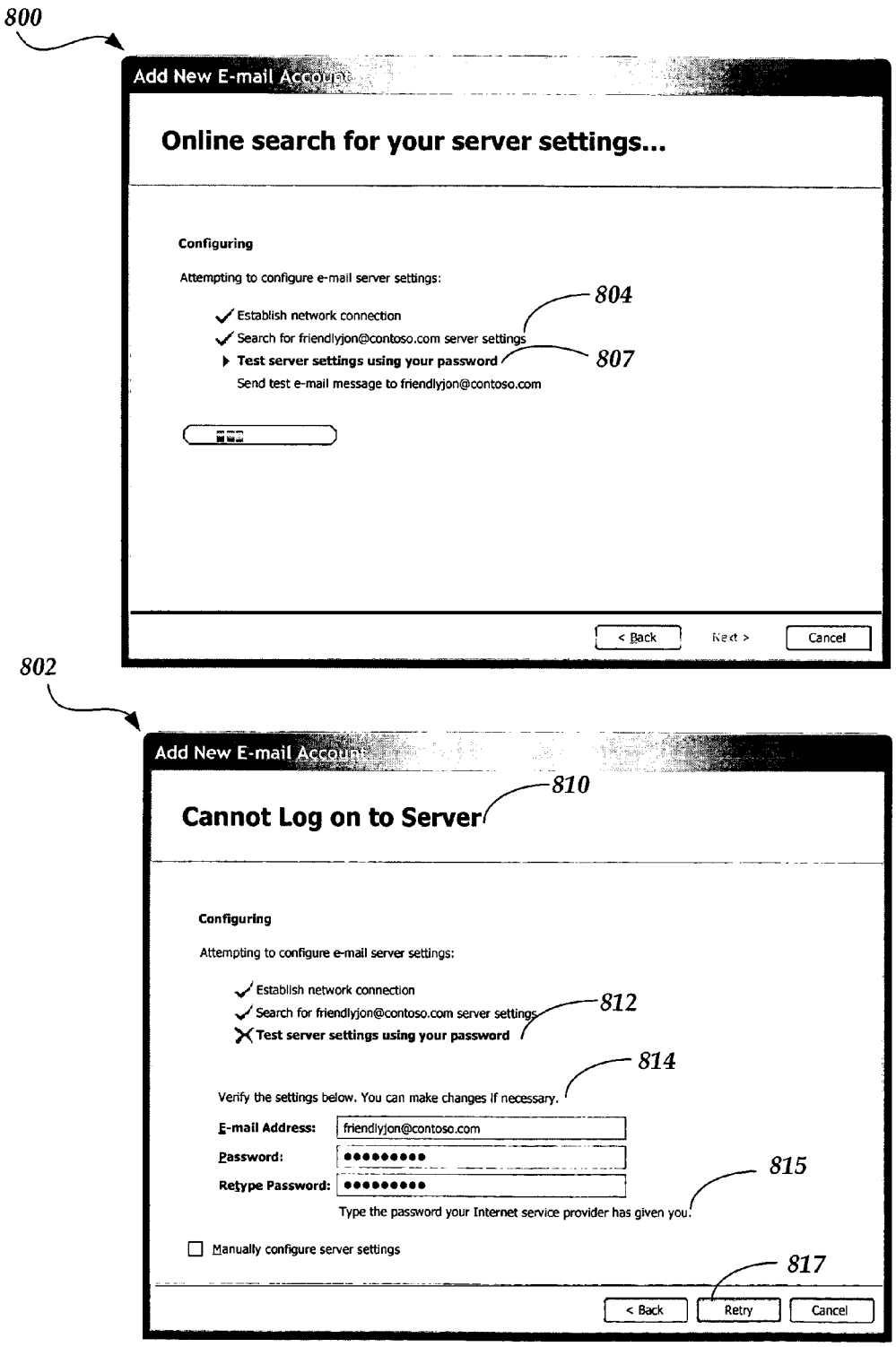
FIG. 8 shows computer screen displays illustrating user interfaces displaying the progress of the configuration process during the online search for server connection settings and a corresponding error screen display when there is a problem logging on to a server utilizing a password according to an illustrative embodiment of the present invention.

FIG. 8 shows computer screen displays illustrating user interfaces 800 and 802 respectively displaying the progress of the configuration process during the online search for server connection settings and a corresponding error screen display when there is a problem logging on to a server utilizing a password according to an illustrative embodiment of the present invention. The user interface 800 displays a checkmark 804 indicating successful completion of a task and task indicator text 807 to show present progress of the configuration process.

The user interface 802 displays an error screen with status indicator text 810 and 812 indicating a problem logging on to a server. The status indicator text 812 is in bold print with an 'X' indicating that the task was unsuccessful. Instruction text 814 and 815 is also provided by the user interface 802 with a data change prompt for an email address and password if necessary. The user interface 802 also prompts the user to continue by selecting the retry button 817.

Figure 9:
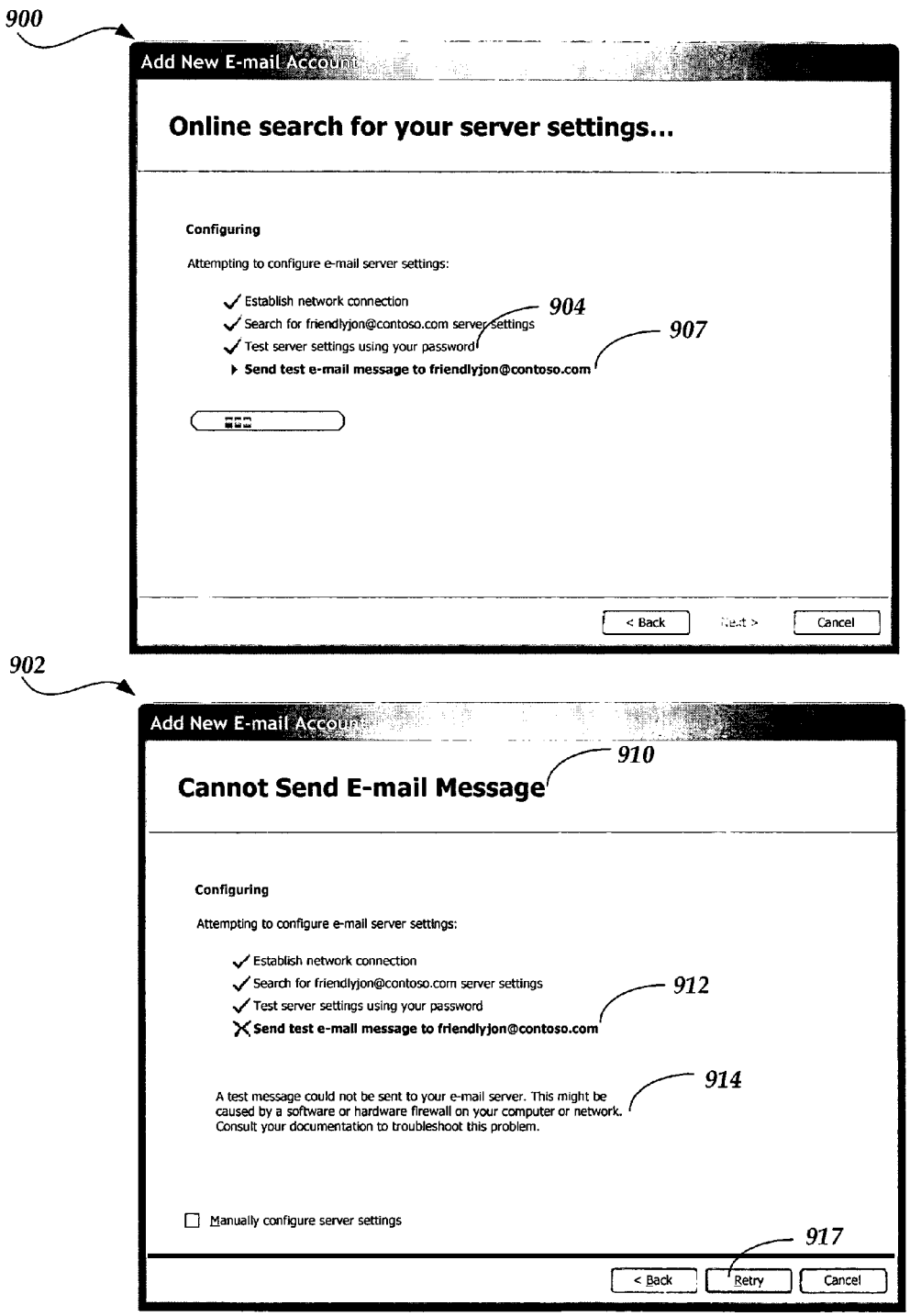
FIG. 9 shows computer screen displays illustrating user interfaces displaying the progress of the configuration process during the online search for server connection settings and a corresponding error screen display when there is a problem sending a test email to an email server according to an illustrative embodiment of the present invention.

FIG. 9 shows computer screen displays illustrating user interfaces 900 and 902 respectively displaying the progress of the configuration process during the online search for server connection settings and a corresponding error screen display when there is a problem sending a test email to an email server according to an illustrative embodiment of the present invention. The user interface 900 displays a checkmark 904 indicating successful completion of a task and task indicator text 907 to show present progress of the configuration process.

The user interface 902 displays an error screen with status indicator text 910 and 912 indicating a problem sending a test email. The status indicator text 912 is in bold print with an 'X' indicating that the task was unsuccessful. Instruction text 914 is also provided by the user interface 902. The user interface 902 also prompts the user to continue by selecting the retry button 917.

Figure 10:
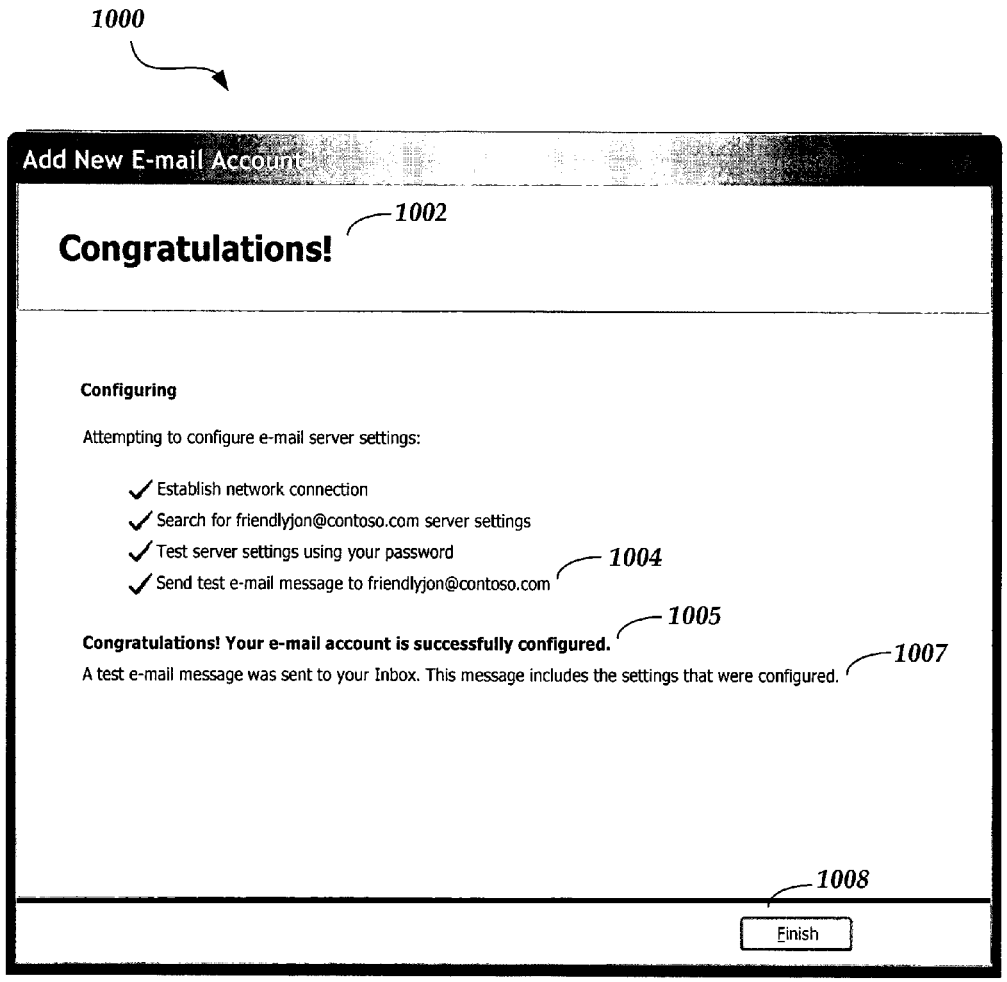
FIG. 10 is a computer screen display illustrating a user interface displaying a successful configuration for an email account according to an illustrative embodiment of the present invention.

FIG. 10 is a computer screen display illustrating a user interface 1000 displaying a successful configuration for an email account according to an illustrative embodiment of the present invention. The user interface 1000 displays congratulatory text 1002 and a checkmark 1004 indicating successful completion of a task. The user interface 100 also displays progress indicator text 1005 and 1007 to show present progress of the configuration process. The user interface 1000 also prompts the user to finish by selecting the finish button 1008.

Figure 11:
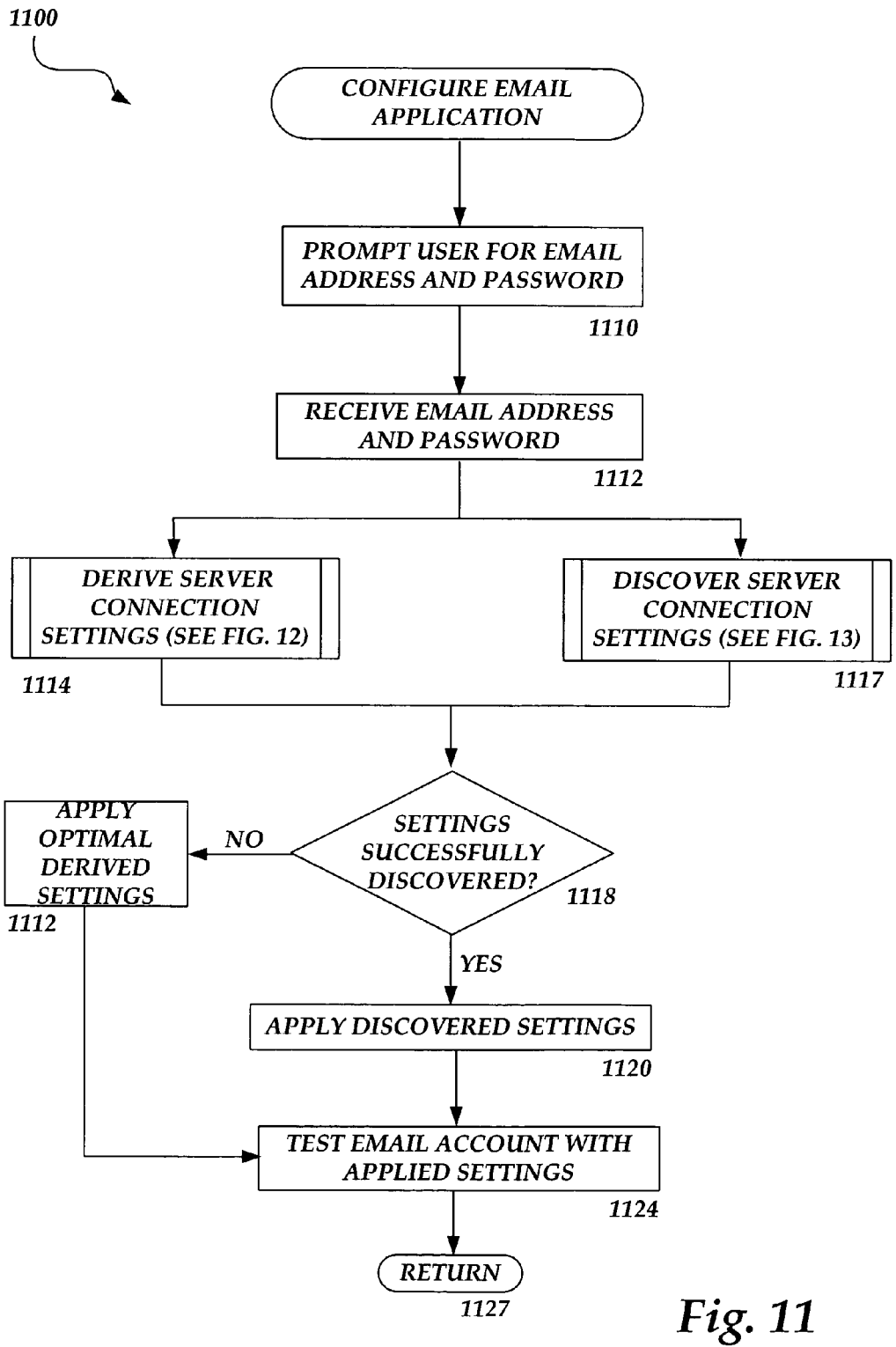
FIG. 11 is an operational flow diagram illustrating a routine performed in configuring electronic messaging applications according to an illustrative embodiment of the present invention.
Figure 12:
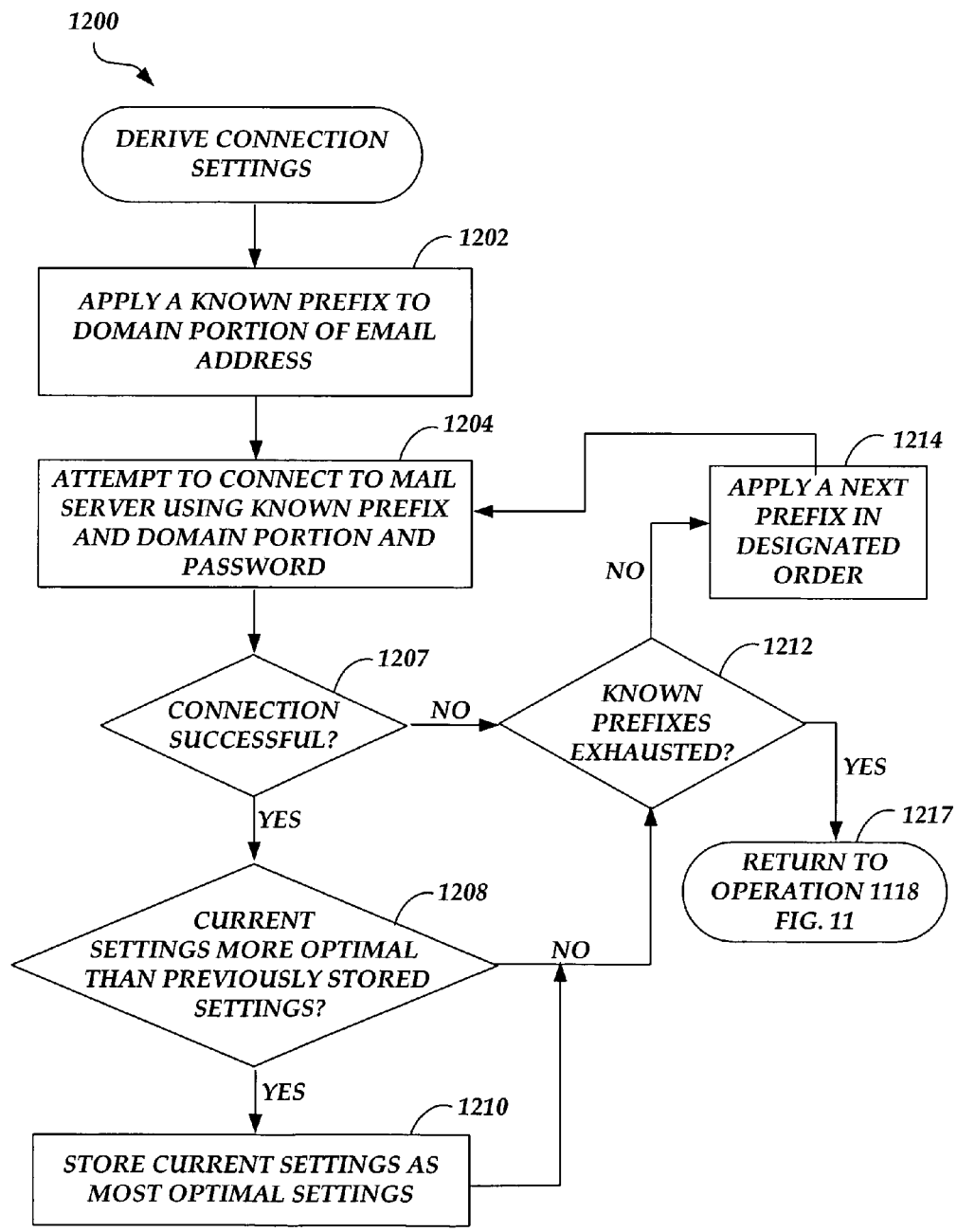
FIG. 12 is an operational flow diagram illustrating a routine performed in deriving server connection settings according to an illustrative embodiment of the present invention.
Figure 13:
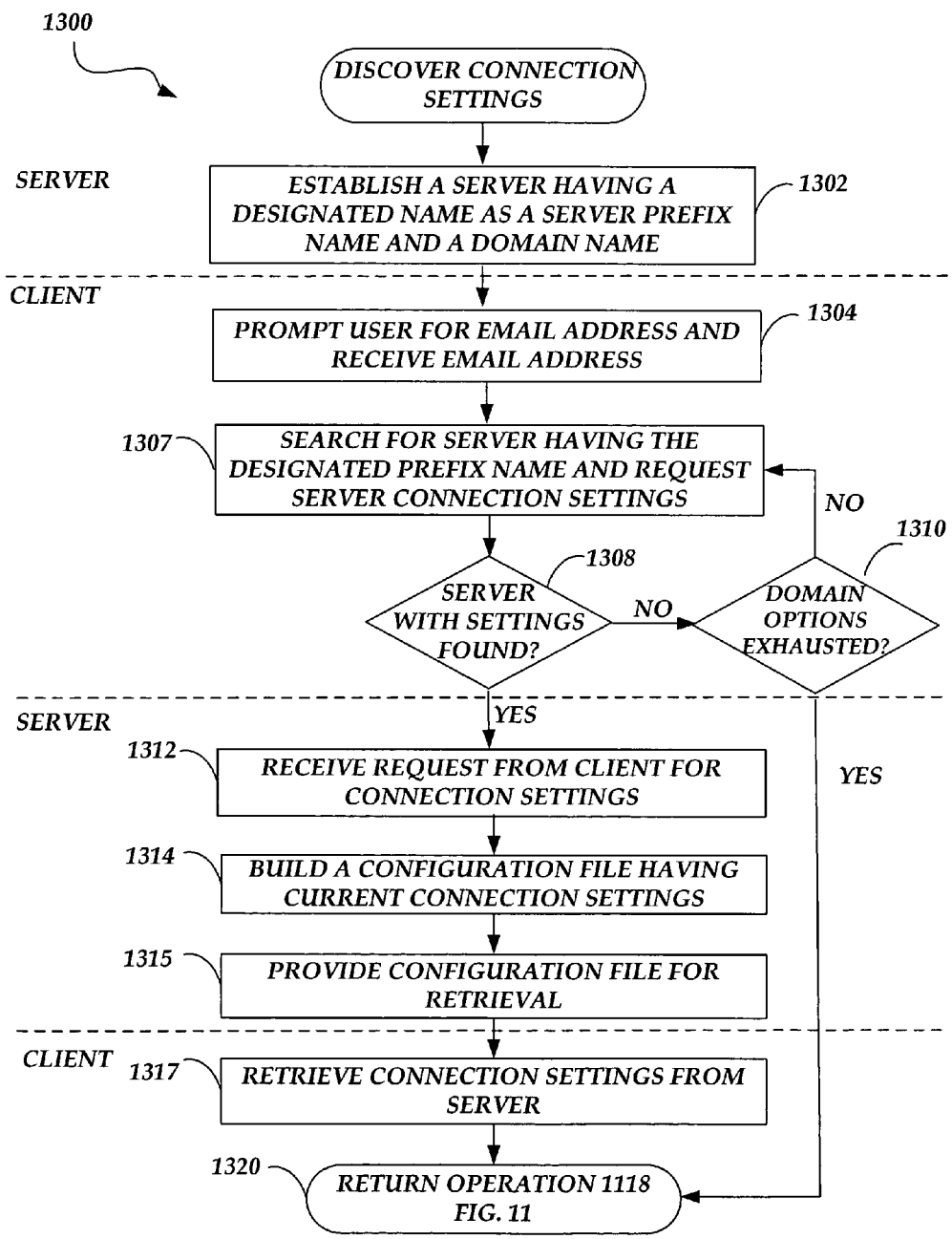
FIG. 13 is an operational flow diagram illustrating a routine performed in discovering the server connection settings according to an illustrative embodiment of the present invention.

FIGS. 11-13 are illustrative routines or operational flows performed in configuring electronic messaging applications according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 11-13, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

FIG. 11 is an operational flow diagram illustrating an operational flow 1100 performed in configuring electronic messaging applications according to an illustrative embodiment of the present invention. The operational flow 1100 begins at operation 1110 where the EMA 104 prompts a user to enter his or her email address and password provided by the user's ISP. Next at operation 1112, the EMA 104 receives the email address and password for future reference.

The operational flow 1100 then asynchronously continues to operations 1114 and 1117. At operation 1114, the EMA 104 derives or guesses server connection settings based on the email address and a successful login with the password. Additional details regarding operation 1114 will be described below with respect to FIG. 12.

At operation 1117, the EMA 104 discovers or retrieves the server connection settings from an XML file dynamically built or statically stored on an AutoDiscovery protocol server, such as the servers 107a-107n of FIG. 1. Additional details regarding operation 1117 will be described below with respect to FIG. 13.

Next the operational flow 1100 continues from operations 1114 and 1117 to detect operation 1118. At detect operation 1118, a determination is made as to whether the server connection settings were successfully discovered at operation 1117. When a determination is made that the server connection settings were successfully discovered at operation 1118, the operational flow continues to apply operation 1120 where the discovered server connection settings are applied to the email account. The operational flow 1100 then continues to test operation 1124 where the email account is tested with the applied settings. This may include receiving or sending a test email.

When a determination is made that the server connection settings were not successfully discovered at detect operation 1118, the operational flow 1100 continues from the detect operation 1118 to apply operation 1112. At the apply operation 1112 the EMA 104 applies the most optimal derived server connection settings based on designated criteria to the email account. The designated criteria may include degree of security, a designated protocol, and a designated authentication process. The operational flow then continues from apply operation 1112 to the test operation 1124 described above. The operational flow 1100 then returns control to other operations at return operation 1127.

FIG. 12 is an operational flow diagram illustrating an operational flow 1200 performed in deriving server connection settings according to an illustrative embodiment of the present invention. The operational flow 1200 begins at operation 1202 where the EMA 204 applies a known prefix name, such as 'pop', to a domain portion of the email address received.

Next at operation 1204, the EMA 104 attempts to connect and login to a mail server using the known prefix name, the domain portion of the email address, and the password. Then at detect operation 1207, the EMA 104 determines whether there has been a successful connection and login. When a successful connection and login does not occur, the operational flow 1200 continues from detect operation 1207 to detect operation 1212. At detect operation 1212, the EMA 104 determines whether the known prefixes, such as the prefix names listed in Table 1, have been exhausted. When the known prefixes have been exhausted, the operational flow 1200 returns control to operation 1118 described above with respect to FIG. 11.

When the know prefixes have not been exhausted, the operational flow 1200 continues from detect operation 1212 to apply operation 1214 where a next known prefix is applied in a designated order. The operational flow 1200 then returns to operation 1204 described above. It should be appreciated that the EMA 104 may also lookup the server prefix name to narrow the number of server name connection attempts.

When a successful connection and login does occur at detect operation 1207, the operational flow 1200 continues from detect operation 1207 to operation 1208. At detect operation 1208, the EMA 104 determines whether the current connection settings are more optimal than previously stored connection settings. The most optimal settings may be determined by designated criteria such as security, authentication, and protocol. When the current settings are not more optimal, the operational flow continues to operation 1212 described above. When the current connection settings are more optimal than the previously stored connection settings, the operational flow 1200 continues from operation 1208 to operation 1210.

At operation 1210, the EMA 104 stores the current connection settings as the most optimal settings based on the designated criteria. The operational flow 1200 then continues to operation 1212 described above.

FIG. 13 is an operational flow diagram illustrating a an operational flow 1300 performed in discovering the server connection settings according to an illustrative embodiment of the present invention. The operational flow 1300 begins at operation 1302 where a mail server computer establishes a designated server name, such as autodiscovery.bar.com, as a server prefix name and domain name to comply with AutoDiscovery protocol.

Next at operation 1304, the EMA 104 prompts a user for and receives an email address. The operational flow 1300 then continues to operation 1307 where the EMA 104 searches over a network for a server having the designated prefix name and requests server connection settings. For instance, each server is sent an HTTP Post command. The post data is an XML request for a certain type of information. The XML will contain information that will help execute the request. For mail, it will include the email address, the protocols the client software supports, the web browser installed, the kind of proxy in use, and the types of authentication that can be used. The server can then return an XML file that will provide the information needed for the client to configure local software to get the user to their destination.

In the case of email, an attempt is made to configure the email client software to connect to the mail server for fast access and offline support. However if this configuration method is not possible because the protocol (MAPI, IMAP, for example) is not supported or the proxy blocks access (POP blocked by Web Proxy), then an address to web based email services may be offered as an alternative.

At operation 1308, the EMA 104 determines whether the server with the server settings has been found. If server connection settings have not been found, the operational flow 1300 continues from operation 1308 to operation 1310 where the EMA 104 determines whether domain options have been exhausted.

If domain options have not been exhausted, the operational flow returns to operation 1307 where the EMA 104 searches for the designated prefix name with a different domain option. If all domain options have been exhausted at operation 1310, the operational flow 1300 returns control to operation 1118 described above with respect to FIG. 11 at return operation 1320.

When at operation 1308, the EMA 104 determines that the connection settings have been found, the operational flow 1300 continues to operation 1312, where the AutoDiscovery service 117*a* receives the request from the EMA 104 for server configuration settings. Next at operation 1314, the AutoDiscovery service builds a server connection setting file in XML having the current connection settings. Then at operation 1315, the AutoDiscovery service provides the server connection settings file for retrieval. It should be appreciated that an ISP server may provide the XML file without building the file in response to a client request.

Next, the operational flow 1300 continues to operation 1317 where the EMA 104 retrieves the connection settings from the server. The operational flow then continues to return operation 1320 described above.

As further illustration of sending a request for server connection settings and providing a response including the server connection settings, a schema for the request and the response for an illustrative embodiment of the present invention is provided as follows:

Request XML Definition

The HTTP POST headers contain information about the request in XML. Multiple REQUEST tags can be used to request information about different types of accounts (Mail vs Buddy List, etc.)

```
<!-- REQUEST TO SERVER. In HTTP POST DATA -->
<? xml version="1.0" encoding="utf-8" ?>
<AutoDiscovery>
    <Request>
        <!-- EMailAddress: Optional
            This tag indicates the user's email address.
        -->
        <EMailAddress>JohnDoe@sample.com</EMailAddress>
        <!-- LegacyDN: Optional
            This tag can only be used for EXCH and EXPR types, and
            indicates the user's Exchange Legacy DN.
        -->
        <LegacyDN>/o=microsoft/ou=First Administrative
        Group/cn=Recipients/cn=dancost</LegacyDN>
    </Request>
</AutoDiscovery>
```

Response XML Definition

```
<!-- RESPONSE FROM THE SERVER -->
<? xml version="1.0" encoding="utf-8" ?>
<AutoDiscovery>
    <!-- User: Optional
        This tag gives user-specific information. AutoDiscovery will
        be UTF-8 encoded.
    -->
    <User>
        <!-- DisplayName: Optional
            The server may have a good formal display name. The client can
            decide to accept it or change it. This will save the user time in the
            default case.
        -->
        <DisplayName>John Doe</DisplayName>
    </User>
    <!-- Response: Required
        This tag serves as an indication that the retrieved XML is an
        AutoDiscovery Response
    -->
    <Response>
        <!-- Account: Required
            This tag specifies the type of account, such as Email vs
            Newsgroups, vs SIP server, etc.
        -->
        <Account>
            <!-- AccountType: Required
                This value indicates the type of the account.
                VALUES:
                    email: The values under this Account tag indicate
                    configuration settings for an email server.
                    nntp: The values under this Account tag indicate configuration
                    settings for a NNTP server.
```

```
-->
<AccountType>email | nntp | etc.</AccountType>
<!-- Action: Required
    This value indicates if the goal of this account results is to
    provide the settings or redirect to another web server that can
    provide results.
    VALUES:
        redirectUrl: If this value is specified, then the URL tag will
        specify the http: or https: URL containing the AutoDiscovery
        results to be used. In order to prevent the server from being
        able to send the client into an infinite loop, the client
        should stop redirecting after 10 redirects.
        redirectAddr: If this value is specified, then the XML tag will
        specify the e-mail address that Outlook should use to execute
        AutoDiscovery again. In other words, the server is telling the
        client that the e-mail address the client should really be using for
        AutoDiscovery is not the one that was posted, but the one
        specified in this tag.
        settings: If this value is specified, then the XML will contain
        the settings needed to configure the account. The settings will
        primarily be under the PROTOCOL tag.
-->
<Action>redirectUrl | redirectAddr | settings</Action>
<!-- RedirectUrl: Required if ACTION tag has value of
    'redirectUrl'. Otherwise this tag will not exist.
    The value will be a http: or https: URL that the client should
    use to obtain the AutoDiscovery settings.
-->
<RedirectUrl>redirect.URL</RedirectUrl>
<!-- RedirectAddr: Required if ACTION tag has value of
    'redirectAddr'. Otherwise this tag will not exist.
    The value will be an email address that the client should use to
    rediscover settings using the AutoDiscovery protocol.
-->
<RedirectAddr>email@address</RedirectAddr>
<!-- Image: Optional
    This is a JPG picture to brand the ISP configuration experience
    with. The client can choose whether or not they download this
    picture to display.
-->
<Image>http://path.to.image.com/image.jpg</Image>
<!-- ServiceHome: Optional
    This is a link to the ISP's Home Page. The client can choose
    whether or not they expose this link to the user.
-->
<ServiceHome>http://web.page.com</ServiceHome>
<!-- Protocol: Required if ACTION tag has value of 'settings'.
    Otherwise, this tag will not exist.
    The tag encloses the specifications for a single account type. The
    list of Protocol tags are in order of preference of the server. The
    client may over ride the preference.
-->
<Protocol>
    <!-- TYPE: Required.
        The value here specifies what kind of mail account is being
        configured.
            EXCH: The protocol to connect to this server is Exchange
        RPC. Only applicable for AccountType=email.
            EXPR: The protocol to connect to this server is Exchange
        RPC over HTTP, using an RPC Proxy server. Only applicable
        for AccountType=email.
            POP3: The protocol to connect to this server is POP3. Only
        applicable for AccountType=email.
            SMTP: The protocol to connect to this server is SMTP.
        Only applicable for AccountType=email.
            IMAP: The protocol to connect to this server is IMAP.
        Only applicable for AccountType=email.
            DAV: The protocol to connect to this server is DAV. Only
        applicable for AccountType=email.
            WEB: Email is accessed from a web browser using an URL
        from the SERVER tag. Only applicable for
        AccountType=email.
            NNTP: The protocol to connect to this server is NNTP.
        Only applicable for AccountType=nntp.
    -->
    <Type>POP3 | SMTP | IMAP | DAV | WEB | EXCH | EXPR |
NNTP</Type>
    <!-- ExpirationDate: Optional.
        The value here specifies the last date which these settings
        should be used. After that date, the settings should be
        rediscovered via AutoDiscovery again. If no value is
        specified, the default will be no expiration.
    -->
    <ExpirationDate>YYYYMMDD</ExpirationDate>
    <!-- TTL: Optional.
        The value here specifies the time to live in hours that these
        settings are valid for. After that time has elapsed (from the
        time the settings were retrieved), the settings should be
        rediscovered via AutoDiscovery again. If no value is
        specified, the default will to not require a rediscovery of
        the settings.
    -->
    <TTL>168</TTL>
    <!-- Server: Required.
        The value here specifies the name of the mail server
        corresponding to the server type specified above.
        For protocols such as POP3, SMTP, IMAP, or NNTP, this
        value will be either a hostname or an IP address.
        For protocols such as DAV or WEB, this will be an URL.
    -->
    <Server>mail.yahoo.com</Server> <!--IP Addr or DNS name of
server-->
    <!-- Port: Optional.
        The value specifies the Port number to use. If no value is
        specified, the default settings will be used depending on the
        mail server type. This value is not used if the SERVER tag
        contains an URL.
        This description applies when using EXCH and EXPR types.
        The value specifies the Port number to use. If no value is
        specified, the default settings will be used depending on the
        mail server type. If zero is specified, the port will be
        dynamically discovered using the RPC end point mapper.
    -->
    <Port>110</Port>
    <!-- DirectoryPort: Optional.
        This value can only be used for EXCH and EXPR types.
        The value specifies the Port number to use. If no value is
        specified, the default settings will be used depending on the
        mail server type. If zero is specified, the port will be
        dynamically discovered using the RPC end point mapper.
    -->
    <DirectoryPort>6004</DirectoryPort>
    <!-- ReferralPort: Optional.
        This value can only be used for EXCH and EXPR types.
        The value specifies the Port number to use. If no value is
        specified, the default settings will be used depending on the
        mail server type. If zero is specified, the port will be
        dynamically discovered using the RPC end point mapper.
    -->
    <ReferralPort>6002</ReferralPort>
    <!-- ASUrl: Optional.
        This value specifies the AS (Availability Service) Server URL
        for an Exchange topology. In the EXCH tag, it specifies the
        URL Outlook will use when connected directly to the server.
        In the EXPR tag, it specifies the URL Outlook will use when
        connected through an RPC Proxy server using RPC/HTTPS.
    -->
    <ASUrl>mail.microsoft.com/exchange/as</ASUrl>
    <!-- OOFUrl: Optional.
        This value specifies the OOF Configuration Server URL
        for an Exchange topology. In the EXCH tag, it specifies
        the URL Outlook will use when connected directly to the
        server. In the EXPR tag, it specifies the URL Outlook
        will use when connected through an RPC Proxy server
        using RPC/HTTPS.
    -->
    <OOFUrl>mail.microsoft.com/exchange/as</OOFUrl>
    <!-- OABUrl: Optional.
        This value specifies the OAB (Offline Address Book) Server
        URL for an Exchange topology. In the EXCH tag, it specifies
        the URL Outlook will use when connected directly to the
        server. In the EXPR tag, it specifies the URL Outlook will use
        when connected through an RPC Proxy server using
        RPC/HTTPS.
    -->
    <OABUrl>mail.microsoft.com/exchange/oab</OABUrl>
    <!-- UMUrl: Optional.
        This value specifies the UM (Unified Messaging) Server URL
```

-continued

```
for an Exchange topology. In the EXCH tag, it specifies the
URL Outlook will use when connected directly to the server.
In the EXPR tag, it specifies the URL Outlook will use when
connected through an RPC Proxy server using RPC/HTTPS.
-->
<UMUrl>mail.microsoft.com/exchange/um</UMUrl>
<!-- LoginName: Optional.
   This value specifies the user's login. If no value is specified,
   the default will be set to the string preceding the '@' in the
   email address. If the Login name contains a domain, the
   format should be <Username>@<Domain>. Such as
   JoeUser@SalesDomain.
-->
<LoginName>johndoe</LoginName>
<!-- DomainRequired: Optional. Default is off.
   If this value is true, then a domain is required during
   authentication. If the domain is not specified in the
   LOGINNAME tag, or the LOGINNAME tag was not
   specified, the user will need to enter the domain before
   authentication will succeed.
-->
<DomainRequired>on | off</DomainRequired>
<!-- DomainName: Optional.
   This value specifies the user's domain. If no value is
   specified, the default authentication will be to use the
   e-mail address as a UPN format <Username>@<Domain>.
   Such as JoeUser@SalesDomain.
-->
<DomainName></DomainName>
<!-- SPA: (Secure Password Authentication) Optional.
   This value specifies whether or not secure password
   authentication is needed.
   If unspecified, the default is set to on.
-->
<SPA>on | off</SPA>
<!-- AuthPackage: Optional.
   This value can only be used for EXCH and EXPR types.
   This value specifies the authentication package used when
   authenticating against the Exchange mailbox server. This
   setting can be overridden to support configurations for the
   external server connect setting.
   If unspecified, the default is set to 'kerbntlm'.
-->
<AuthPackage>basic | kerb | kerbntlm | ntlm |
certificate</AuthPackage>
<!-- CertPincipalName: Optional.
   This value can only be used for EXPR types.
   This value specifies the SSL certificate principal name
   required when connecting externally from the Exchange
   topology and using SSL.
   If unspecified, the default is set to msstd:SERVER. For
   example, if SERVER were specified as
   "exchangedogfood.com" and CERTPRINCNAME were left
   blank with SSL on, the default value of CERTPRINCNAME
   would be "msstd:exchangedogfood.com".
   If 'none' is specified, mutual authentication when using SSL
   will not be performed.
-->
<CertPincipalName>none | servername</CertPincipalName>
<!-- SSL: Optional.
   This value specifies whether secure login is needed.
   If unspecified, the default is set to on.
-->
<SSL>on | off</SSL>
<!-- AuthRequired: Optional.
   This value specifies whether authentication is needed
   (password).
   If unspecified, the default is set to on.
-->
<AuthRequired>on | off</AuthRequired> <!-- Optional: Is
Authentication required? -->
<!-- UsePOPAuth: Optional.
   This value can only be used for SMTP types.
   If specified, then the authentication information provided for
   the POP3 type account will also be used for SMTP.
-->
<UsePOPAuth>on | off</UsePOPAuth>
<!-- SMTPLast: Optional. Default is off.
   If this value is true, then the SMTP server requires that email
   be downloaded before sending email via the SMTP server.
   This is often required because the SMTP server verifies
   that the authentication succeeded when downloading email.
-->
<SMTPLast>on | off</SMTPLast>
<!-- NetworkRequirements: Optional
   If this NetworkRequirements tag exists, then it contains
   criteria to determine if the computer is on a network that
   meets the Internet Service Providers requirements to
   connect to this server.
   If the email client finds that it does not match the network
   requirements, then it should try other protocol tags. Internet
   Service Providers may provide one set of servers
   (PROTOCOL tags) that don't require authentication
   but do require being on the ISP network. It may then list
   another set of servers (PROTOCOL tags) that require
   authentication but not being on a specific network.
   Internet Service Providers are requested to provide IPv6
   address ranges in addition to the IPv4 address range.
-->
<NetworkRequirements>
   <IPv4Start>157.56.54.001</IPv4Start>
   <IPv4End>157.56.58.240</IPv4End>
   <IPv6Start>3ffe:8311:ffff:f091:c95e:4107:7418:7ab6
   </IPv6Start>
   <IPv6End>fe80::2b0:d0ff:feab:b35f% 10</IPv6End>
</NetworkRequirements>
   </Protocol>
  </Account>
 </Response>
</AutoDiscovery>
```

Based on the foregoing, it should be appreciated that the various embodiments of the invention include methods, systems, and computer-readable mediums for configuring electronic messaging applications. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for configuring an electronic mail message application to communicate with a server storing electronic mail messages at least one of to and from an electronic mail message account of a user, the computer-implemented method being executed when computer-readable instructions, stored on at least one memory, are executed by at least one processing unit of a computing system, the computer-implemented method comprising:
receiving an electronic mail message address and a password from the electronic mail message application;
attempting to retrieve server connection settings from a designated server while asynchronously deriving the server connection settings based on the electronic mail message address, wherein the server connection settings are unknown to the electronic mail message application and are necessary for establishing a connection between the electronic mail message application and the server, and wherein deriving server connection settings further comprises:
determining a domain portion of the electronic mail message address, wherein the domain portion includes a domain name and a top level domain;
prepending one or more known server prefix names to a front end of the domain portion of the electronic mail message address to yield a server domain combination;
calculating one or more permutations of the server domain combination;

evaluating the one or more permutations of the server domain combination to determine the server connection settings, the evaluating comprising:
attempting to establish a connection using the one or more permutations of the server domain combination and the password; and
detecting a connection to the server when at least one permutation of the server domain combination is successfully used with the password; and
identifying the at least one successful permutation of the server domain combination as the server connection settings; and
in response to detecting the connection to the server with the server connection settings, sending the server connection settings to the electronic mail message application.

2. The computer-implemented method of claim 1, wherein deriving the server connection settings further comprises:
a) in response to detecting a connection to the server, determining whether the server connection settings are more optimal than previously stored server connection settings based on at least one of a security criterion, a protocol criterion, and an authentication criterion; and
b) in response to determining that the server connection settings are more optimal, storing the more optimal server connection settings as the server connection settings; and repeating a)-b) for each of the one or more permutations of the server domain combination for at least one of receive protocols and send protocols.

3. The computer-implemented method of claim 1, further comprising searching for configured known server prefix names based on the domain portion of the electronic mail message address in order to narrow a number of attempts to connect to the server.

4. The computer-implemented method of claim 2, wherein attempting to establish a connection to the server comprises simultaneously attempting to establish a connection to the server on a secure port and a non-secure port of the server.

5. The computer-implemented method of claim 4, further comprising:
detecting the connection to the server by receiving an affirmative response greeting on a TCP session; and
storing the secure port as one of the more optimal server connection settings when the affirmative response greeting is returned on the secure port and on the non-secure port.

6. The computer-implemented method of claim 1, wherein receiving the electronic mail message address comprises receiving an electronic mail message address wherein the one or more known server prefix names comprise a POP server prefix name including one of 'pop', 'mail', 'sslmail', 'pop3', 'securepop' and no server prefix name.

7. The computer-implemented method of claim 1, wherein receiving the electronic mail message address comprises receiving an electronic mail message address wherein the one or more known server prefix names comprise an IMAP server prefix name including one of 'mail', 'imap', and no server prefix name.

8. The computer-implemented method of claim 1, wherein receiving the electronic mail message address comprises receiving an electronic mail message address wherein the one or more known server prefix names comprise an SMTP server prefix name including one of 'smtp', 'smtpauth', 'mail', 'mailhost', 'securesmtp', and no server prefix name.

9. A computer-implemented method for configuring an electronic mail message application to communicate with a server storing electronic mail messages for an electronic mail message account of a user, the computer-implemented method being executed when computer-readable instructions, stored on at least one memory, are executed by at least one processing unit of a computing system, the computer-implemented method comprising:
receiving an electronic mail message address, wherein the electronic mail message address comprises a plurality of ordered levels of intermediate domain names preceding a top level domain, the plurality of ordered levels beginning with a lowest level and ending with a highest level;
discovering server connection settings for the electronic mail message account on a designated server having a designated server name and having the server connection settings, wherein the server connection settings are necessary for establishing a connection between the electronic mail message application and the server, and wherein discovering the server connection settings further comprises:
generating a list of one or more designated servers, wherein generating the list comprises at least prepending the designated server name as a prefix to the one or more ordered levels of intermediate domain names preceding the top level domain to form an initial server domain name;
attempting to establish a connection to the designated server using the initial server domain name by sending a first HTTP Post command, wherein the HTTP Post command comprises at least the electronic mail message address;
in response to failing to establish a connection to the designated server, trimming a lowest level of the one or more ordered levels of intermediate domain names from the initial server domain name;
attempting to establish a connection to the designated server using the trimmed initial server domain name by sending a second HTTP Post command, wherein the second HTTP Post command comprises at least the electronic mail message address;
in response to establishing a connection to the designated server, retrieving the server connection settings from a file provided by the designated server; and
sending the retrieved server connection settings to the electronic mail message application.

10. The computer-implemented method of claim 9, wherein discovering the server connection settings further comprises:
in response to reaching the highest level of the one or more ordered levels of intermediate domain names without connecting to the designated server, applying the designated server name as a server prefix name to a public domain service to form a public server domain name; and
searching for the designated server as the server prefix name by sending a request for the server connection settings over a network to the public server domain name.

11. The computer-implemented method of claim 9, wherein retrieving the server connection settings from the file provided by the designated server comprises retrieving the server connection settings from a markup language file.

12. The computer-implemented method of claim 11, wherein retrieving the server connection settings from a markup language file comprises retrieving the server connection settings from an XML file provided by the designated server.

13. The computer-implemented method of claim 12, wherein retrieving the server connection settings from an XML file comprises retrieving the server connection settings from an XML file built by the designated server from a dynamic directory of electronic mail message account server connection settings.

14. The computer-implemented method of claim 10, further comprising:
simultaneously deriving the server connection settings based on the electronic mail message address wherein applying the server connection settings to the electronic mail message account comprises applying the server connection settings derived when the server connection settings cannot be discovered.

15. The computer-implemented method of claim of claim 9, wherein retrieving the server connection settings from the file provided by the designated server comprises retrieving the server connection settings both in a version for retrieval inside a firewall and in a version for retrieval outside the firewall.

16. The computer-implemented method of claim 9, wherein the designated server name of the designated server is "autodiscover."

17. A computer storage medium, having computer-readable instructions stored thereon for configuring an electronic mail message application to communicate with a server storing electronic mail messages for an electronic mail message account of a user, the method comprising:
receiving an electronic mail message address, wherein the electronic mail message address comprises a plurality of ordered levels of intermediate domain names preceding a top level domain, the plurality of ordered levels beginning with a lowest level and ending with a highest level;
discovering server connection settings for the electronic mail message account on a designated server having a designated server name and having the server connection settings, wherein the server connection settings are necessary for establishing a connection between the electronic mail message application and the server, and wherein discovering the server connection settings further comprises:
generating a list of one or more designated servers, wherein generating the list comprises at least prepending the designated server name as a prefix to the one or more ordered levels of intermediate domain names preceding the top level domain to form an initial server domain name;
attempting to establish a connection to the designated server using the initial server domain name by sending a first HTTP Post command, wherein the HTTP Post command comprises at least the electronic mail message address;
in response to failing to establish a connection to the designated server, trimming a lowest level of the one or more ordered levels of intermediate domain names from the initial server domain name;
attempting to establish a connection to the designated server using the trimmed initial server domain name by sending a second HTTP Post command, wherein the second HTTP Post command comprises at least the electronic mail message address;
in response to establishing a connection to the designated server, retrieving the server connection settings from a file provided by the designated server; and
sending the retrieved server connection settings to the electronic mail message application.

18. The computer storage medium of claim 17, wherein discovering the server connection settings further comprises:
in response to reaching the highest level of the one or more ordered levels of intermediate domain names without connecting to the designated server, applying the designated server name as a server prefix name to a public domain service to form a public server domain name; and
searching for the designated server as the server prefix name by sending a request for the server connection settings over a network to the public server domain name.

19. The computer storage medium of claim 17, wherein retrieving the server connection settings from the file provided by the designated server comprises retrieving the server connection settings from a markup language file.

20. The computer storage medium of claim 17, wherein the designated server name of the designated server is "autodiscover."

* * * * *